United States Patent
Chang et al.

(10) Patent No.: US 7,257,418 B1
(45) Date of Patent: Aug. 14, 2007

(54) RAPID USER ACQUISITION BY A GROUND-BASED BEAMFORMER

(75) Inventors: Donald C. D. Chang, Thousand Oaks, CA (US); Alan Cha, Glendale, CA (US); Ying Feria, Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1120 days.

(21) Appl. No.: 09/652,862

(22) Filed: Aug. 31, 2000

(51) Int. Cl.
*H04Q 7/20* (2006.01)
(52) U.S. Cl. ............ 455/458; 455/12.1; 455/427
(58) Field of Classification Search ......... 455/12.1, 455/13.1, 427, 429, 456, 562, 458; 342/357.01, 342/357.16, 457; 244/158 R
See application file for complete search history.

(56) References Cited

U.S. PATENT DOCUMENTS

| | | | |
|---|---|---|---|
| 3,541,553 A | 11/1970 | S Gubin | |
| 3,665,464 A | 5/1972 | Meilander | |
| 4,635,063 A | 1/1987 | Chang et al. | 342/380 |
| 4,799,065 A * | 1/1989 | Thompson | 343/779 |
| 4,827,265 A * | 5/1989 | Das et al. | 342/78 |
| 4,994,809 A | 2/1991 | Yung et al. | |
| 5,017,927 A | 5/1991 | Agrawal et al. | 342/371 |
| 5,077,562 A | 12/1991 | Chang et al. | 342/368 |
| 5,081,464 A | 1/1992 | Renshaw | |
| 5,151,706 A | 9/1992 | Roederer et al. | |
| 5,181,041 A | 1/1993 | Lind et al. | |
| 5,218,619 A | 6/1993 | Dent | 375/1 |
| 5,379,320 A | 1/1995 | Fernandes et al. | |
| 5,410,314 A | 4/1995 | Frush et al. | |
| 5,444,450 A | 8/1995 | Olds et al. | |
| 5,475,520 A * | 12/1995 | Wissinger | 359/172 |
| 5,550,809 A | 8/1996 | Bottomley et al. | 370/18 |
| 5,555,257 A | 9/1996 | Dent | 370/95.1 |
| 5,555,444 A * | 9/1996 | Diekelman et al. | 370/342 |
| 5,572,216 A | 11/1996 | Weinberg et al. | 342/357 |
| 5,584,046 A * | 12/1996 | Martinez et al. | 455/13.1 |
| 5,589,834 A | 12/1996 | Weinberg | |
| 5,594,941 A | 1/1997 | Dent | 455/13.4 |
| 5,612,701 A | 3/1997 | Diekelman | 342/354 |

(Continued)

FOREIGN PATENT DOCUMENTS

EP   0 549 220 A2   6/1993

(Continued)

OTHER PUBLICATIONS

U.S. Appl. No. 09/611,753, filed Jul. 7, 2000, Chang et al.

(Continued)

*Primary Examiner*—William Trost
*Assistant Examiner*—James D Ewart
(74) *Attorney, Agent, or Firm*—Georgann S. Grunebach

(57) ABSTRACT

A method for rapid acquisition of a specific subscriber by a ground-based beamformer includes the steps of defining a coverage area as an arrangement of a plurality of cells wherein one of the plurality of cells includes a specific subscriber; defining a partition of cell clusters wherein one of the cell clusters includes the one of the plurality of cells that includes the specific subscriber; forming a beam that corresponds to an area of one of the cell clusters; and scanning the beam to the cell cluster that includes the specific subscriber.

23 Claims, 6 Drawing Sheets

U.S. PATENT DOCUMENTS

| | | | |
|---|---|---|---|
| 5,644,572 | A | 7/1997 | Olds et al. |
| 5,754,139 | A | 5/1998 | Turcotte et al. |
| 5,764,187 | A | 6/1998 | Rudish et al. |
| 5,764,188 | A | 6/1998 | Ghosh et al. |
| 5,790,070 | A | 8/1998 | Natarajan et al. |
| 5,810,284 | A | 9/1998 | Hibbs et al. ............... 244/13 |
| 5,856,804 | A | 1/1999 | Turcotte et al. ............ 342/371 |
| 5,862,480 | A | 1/1999 | Wild et al. |
| 5,903,549 | A | 5/1999 | Von der Embse et al. .. 370/310 |
| 5,907,813 | A | 5/1999 | Johnson, Jr. et al. |
| 5,907,816 | A | 5/1999 | Newman et al. |
| 5,909,460 | A | 6/1999 | Dent ........................ 375/200 |
| 5,917,447 | A | 6/1999 | Wang et al. ................ 342/383 |
| 5,920,284 | A | 7/1999 | Victor |
| 5,949,766 | A | 9/1999 | Ibanez-Meier et al. ..... 370/316 |
| 5,973,647 | A | 10/1999 | Barrett et al. ............... 343/713 |
| 5,974,039 | A | 10/1999 | Schilling |
| 5,974,317 | A | 10/1999 | Djuknic et al. |
| 6,002,935 | A | 12/1999 | Wang |
| 6,016,124 | A | 1/2000 | Lo et al. |
| 6,032,041 | A | 2/2000 | Wainfan et al. |
| 6,058,308 | A * | 5/2000 | Kallin et al. ................ 455/456 |
| 6,061,562 | A | 5/2000 | Martin et al. |
| 6,072,986 | A * | 6/2000 | Blanchard et al. ............ 455/69 |
| 6,088,341 | A | 7/2000 | Hinedi et al. |
| 6,111,542 | A | 8/2000 | Day et al. ................... 342/359 |
| 6,147,658 | A | 11/2000 | Higashi et al. .............. 343/853 |
| 6,151,308 | A | 11/2000 | Ibanez-Meier et al. ..... 370/316 |
| 6,151,496 | A | 11/2000 | Richards et al. |
| 6,173,178 | B1 | 1/2001 | Hammill et al. |
| 6,195,037 | B1 | 2/2001 | Gross et al. |
| 6,195,555 | B1 | 2/2001 | Dent |
| 6,208,858 | B1 | 3/2001 | Antonio et al. |
| 6,240,072 | B1 * | 5/2001 | Lo et al. ...................... 455/63 |
| 6,243,587 | B1 | 6/2001 | Dent et al. |
| 6,272,317 | B1 * | 8/2001 | Houston et al. ............ 455/436 |
| 6,289,211 | B1 | 9/2001 | Koorapaty et al. |
| 6,298,238 | B1 | 10/2001 | Dai |
| 6,311,068 | B1 | 10/2001 | Leung et al. |
| 6,313,790 | B2 | 11/2001 | Chang et al. |
| 6,314,269 | B1 | 11/2001 | Hart et al. |
| 6,324,398 | B1 | 11/2001 | Lanzerotti et al. |
| 6,339,708 | B1 | 1/2002 | Wang |
| 6,340,947 | B1 | 1/2002 | Chang et al. |
| 6,366,256 | B1 * | 4/2002 | Ramanujam et al. ....... 342/464 |
| 6,377,208 | B2 | 4/2002 | Chang et al. |
| 6,380,893 | B1 | 4/2002 | Chang et al. |
| 6,388,615 | B1 * | 5/2002 | Chang et al. ................. 455/69 |
| 6,414,646 | B2 * | 7/2002 | Luh ........................... 455/456 |
| 6,424,646 | B1 * | 7/2002 | Gerszberg et al. .......... 455/456 |
| 6,424,831 | B1 * | 7/2002 | Schiff ......................... 455/522 |
| 6,429,823 | B1 * | 8/2002 | Bains et al. ................ 455/456 |
| 6,434,384 | B1 | 8/2002 | Norin et al. |
| 6,438,379 | B1 | 8/2002 | Gitlin et al. |
| 6,456,846 | B2 * | 9/2002 | Norin et al. .................. 455/69 |
| 6,480,154 | B1 * | 11/2002 | Bella et al. ................. 342/372 |
| 6,480,788 | B2 | 11/2002 | Kilfeather et al. |
| 6,507,314 | B2 | 1/2003 | Chang et al. |
| 6,559,797 | B1 | 5/2003 | Chang |
| 6,563,457 | B2 | 5/2003 | Chang et al. |
| 6,598,014 | B1 | 7/2003 | Rabideau et al. |
| 6,615,024 | B1 | 9/2003 | Boros et al. |
| 7,068,733 | B2 | 6/2006 | Chang et al. |
| 2001/0045903 | A1 | 11/2001 | Chang et al. |
| 2001/0048389 | A1 | 12/2001 | Nakagawa |
| 2002/0006795 | A1 | 1/2002 | Norin |
| 2002/0053987 | A1 | 5/2002 | Chang et al. |
| 2002/0107034 | A1 | 8/2002 | Chang et al. |
| 2002/0126042 | A1 | 9/2002 | Chang et al. |

FOREIGN PATENT DOCUMENTS

| | | |
|---|---|---|
| EP | 0 845 874 A2 | 6/1998 |
| EP | 0 860 708 A | 8/1998 |
| EP | 0 860 709 A | 8/1998 |
| EP | 0 860 710 A2 | 8/1998 |
| EP | 1 010 988 A2 | 6/2000 |
| WO | WO90/13186 | 11/1990 |
| WO | WO95/04407 | 2/1995 |
| WO | WO9802762 A | 1/1998 |
| WO | 1 037 403 A2 | 9/2000 |
| WO | WO 01/94969 A2 | 12/2001 |

OTHER PUBLICATIONS

U.S. Appl. No. 09/655,498, filed Sep. 5, 2000, Chang et al.

U.S. Appl. No. 09/655,041, filed Sep. 5, 2000, Chang et al.

K. K. Chan, F. Marcoux, M. Forest, L. Martins-Camelo, "A Circularly Polarized Waveguide Array for Leo Satellite Communications", pp. 154-157, IEEE1999 AP-S International Symposium, Jun. 1999.

M. Oodo, R. Miura, Y. Hase, "Onboard DBF Antenna for Stratospheric Platform", pp. 125-128, IEEE Conference on Phased Array Systems and Technology, California, May 21-25, 2000.

Yokosuka Research Park, "The First Stratospheric Platform Systems Workshop", pp. 1-216, May 12-13, 1999.

Chiba, Isamu et. al, "Digital Beam Forming (DBF) Antenna System for Mobile Communications", IEEE AES Systems Magazine, Sep. 1997, pp. 31-41.

Miura, Ryu et. al, "A DBF Self-Beam Steering Array Antenna for Mobile Satellite Applications Using Beam-Space Maximal-Ratio Combination", IEEE Trans. On Vehicular Technology, vol. 48, No. 3, May 1999, pp. 665-675.

Sato, Kazuo et al., "Development and Field Experiments of Phased Array Antenna for Land Vehicle Satellite Communications", IEEE Antennas and Propagation Society International Symposium, 1992, Jul. 1992, vol. 2, pp. 1073-1076.

Sakakibara, Kunio et. al, "A Two-Beam Slotted Leaky Waveguide Array for Mobile Reception of Dual-Polarization DBS", IEEE Transactions on Vehicular Technology, vol. 48, No. 1, Jan. 1999, pp. 1-7.

Suzuki, R. et .al, :Mobile TDM/TDMA System With Active Array Antenna, Global Telecommunications Conference, 1991; Globecom '91, vol. 3, Dec. 2-5, 1991, pp. 1569-1573.

Colella, Nicholas J. et al., "The HALO Network™", IEEE Communications Magazine, Jun. 2000, pp. 142-148.

Colella, Nicholos J. et al., "High Speed Internet Access via Stratospheric HALO Aircraft", INET 99 Proceedings, Internet Society, Technology, Wireless, 13 pages, Jun. 8, 1999.

U.S. Appl. No. 09/587,759, filed Jun. 6, 2000, Yung et al.

* cited by examiner

RAPID USER ACQUISITION BY A GROUND-BASED BEAMFORMER

BACKGROUND OF THE INVENTION

The present invention relates generally to ground-based beamformers. More specifically, but without limitation thereto, the present invention relates to finding a cell in which a specific user is located within the coverage area of a stratospheric transponder platform linked to a ground-based beamformer.

An antenna array on a stratospheric transponder platform can support multiple subscribers dispersed over a wide coverage area. To reduce weight, power consumption, and cost of the stratospheric transponder platform, a ground-based digital beamformer may be used that performs the beam calculations on the ground from a ground station linked to the antenna elements on the stratospheric transponder platform. In this arrangement, the element excitation signals are passed between the antenna elements on the stratospheric transponder platform and the digital beamformer in the ground station using CDMA techniques, for example.

Solar powered stratospheric transponder platforms have the capability of staying aloft for a long period of time, but their weight and power generation capacity are disadvantageously limited. Ground-based digital beamforming removes the weight and power requirements of the beamformer from the stratospheric platform to the ground station, and also provides an advantageous system architecture known as "spokes and hub." In this architecture, all system data and communications processing functions are co-located in the ground station. Because system data does not have to be passed back and forth between the stratospheric transponder platforms and the ground station, valuable communications resources are conserved, resulting in faster processing time and system response.

An important function performed by communications systems including ground stations in a spokes and hub architecture is acquiring a specific subscriber, i.e., locating the cell in a platform coverage area in which a specific subscriber is located.

FIG. 1 is a diagram illustrating a method 100 for locating a specific subscriber 102 in a coverage area 104. According to the method 100, each cell 106 within the coverage area 104 is scanned by stepping a beam 108 from a beamformer located in a stratospheric transponder platform 120 sequentially to each cell 106 until the cell containing the specific subscriber 102 is located. Although a communications satellite is used to illustrate a transponder platform in this example, other transponder platforms may be used, such as unmanned aircraft and antenna towers In this example, the coverage area 104 is 64 km×64 km and is divided into 64 cells 106 that are each 8 km×8 km. The beam 108 is stepped in raster scan fashion from cell to cell in each row, and from one row to the next until the specific subscriber 102 is located, in this example, after stepping the beam 108 30 times. Assuming a dwell time of T, locating the specific subscriber 102 requires from T to 64 T, depending on where the cell containing the specific subscriber 102 is located.

Disadvantageously, the method 100 requires an average acquisition time of 32T, or more generally, NT/2, where N is the number of cells in the coverage area. Because N may be a large number, processing the many beams slows acquisition time and thus adversely affects the system response.

SUMMARY OF THE INVENTION

The present invention advantageously addresses the needs above as well as other needs by providing a method and apparatus for rapid acquisition of a specific subscriber within a coverage area of a transponder platform.

In one embodiment, the invention may be characterized as a method for rapid acquisition of a specific subscriber that includes the steps of defining a coverage area as an arrangement of a plurality of cells wherein one of the plurality of cells includes a specific subscriber; defining a partition of cell clusters wherein one of the cell clusters includes the one of the plurality of cells that includes the specific subscriber; forming a beam to correspond to an area of one of the cell clusters; and scanning the beam to the cell cluster that includes the specific subscriber.

In another embodiment, the invention may be characterized as a ground-based beamformer for rapid acquisition of a specific subscriber that includes a stratospheric transponder platform having an antenna for one of transmitting and receiving a beam; and a ground station coupled to the stratospheric transponder platform wherein the ground station comprises a beamformer for at least one of zooming the beam to form a beam corresponding to an area of a cell cluster within a partition containing a plurality of cell clusters and scanning the beam to one of the plurality of cell clusters that includes a specific subscriber.

The features and advantages summarized above in addition to other aspects of the present invention will become more apparent from the description, presented in conjunction with the following drawings.

BRIEF DESCRIPTION OF THE DRAWINGS

The above and other aspects, features and advantages of the present invention will be more apparent from the following more specific description thereof, presented in conjunction with the following drawings wherein.

Corresponding reference characters indicate corresponding elements throughout the several views of the drawings.

DETAILED DESCRIPTION OF THE DRAWINGS

The following description is presented to disclose the currently known best mode for making and using the present invention. The scope of the invention is defined by the claims.

Figure 1:
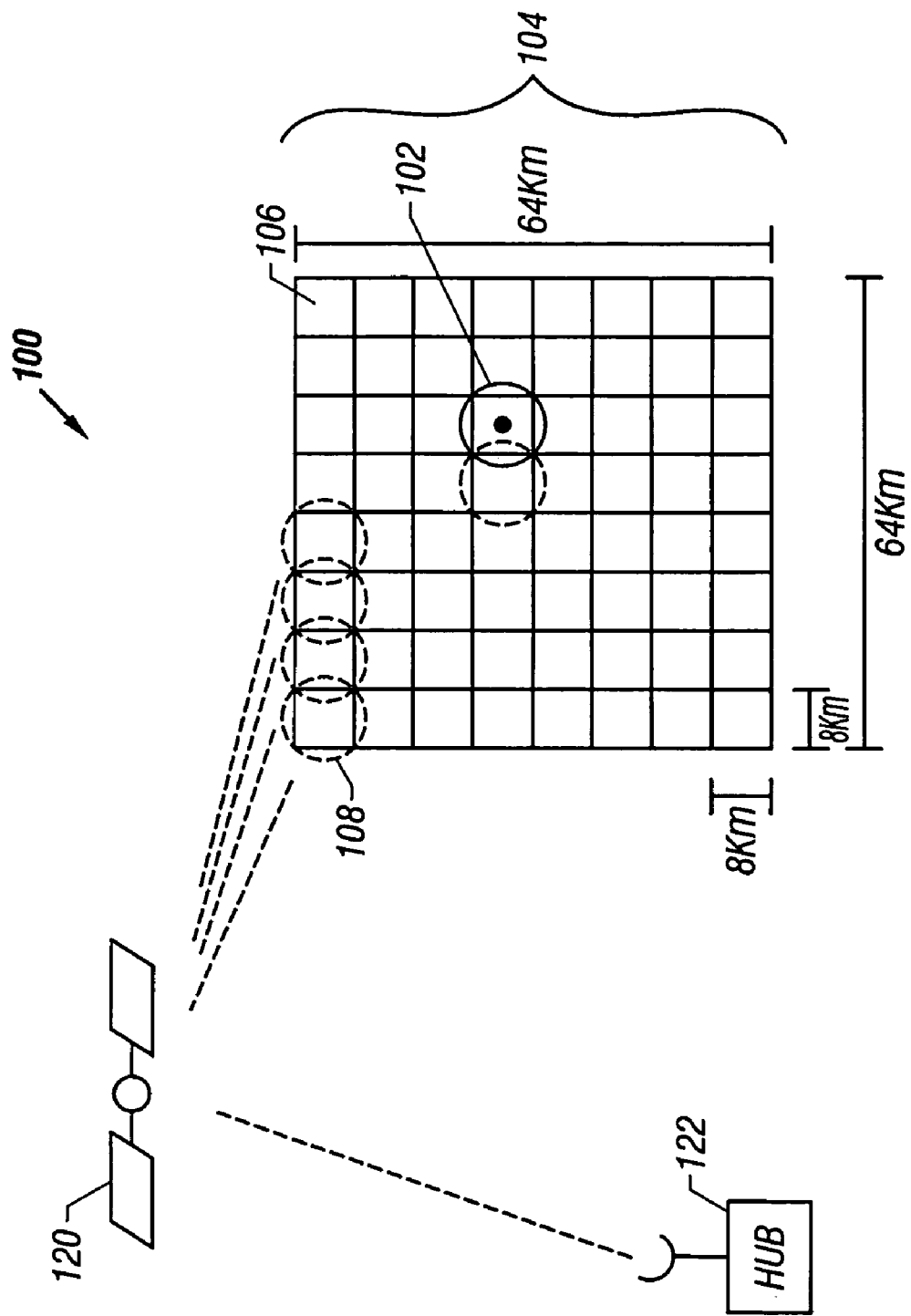
FIG. 1 is a diagram illustrating a method for locating a specific subscriber in a coverage area.

The method 100 illustrated in FIG. 1 described above for locating the specific subscriber 102 in the coverage area 104 may be implemented by a ground-based beamformer in a CDMA communications system gateway hub 122. By locating the beamformer at the ground station, the disadvantages of the added weight and power required to include a beamformer in the payload of a stratospheric transponder platform 120 may be advantageously avoided. Also, the separate beam signals and control signals do not have to be passed back and forth between the ground station and the transponder platform, thus reducing the communications traffic overhead of the system. An example of a ground-based digital beamformer will be described later with reference to FIG. 5.

Figure 2:
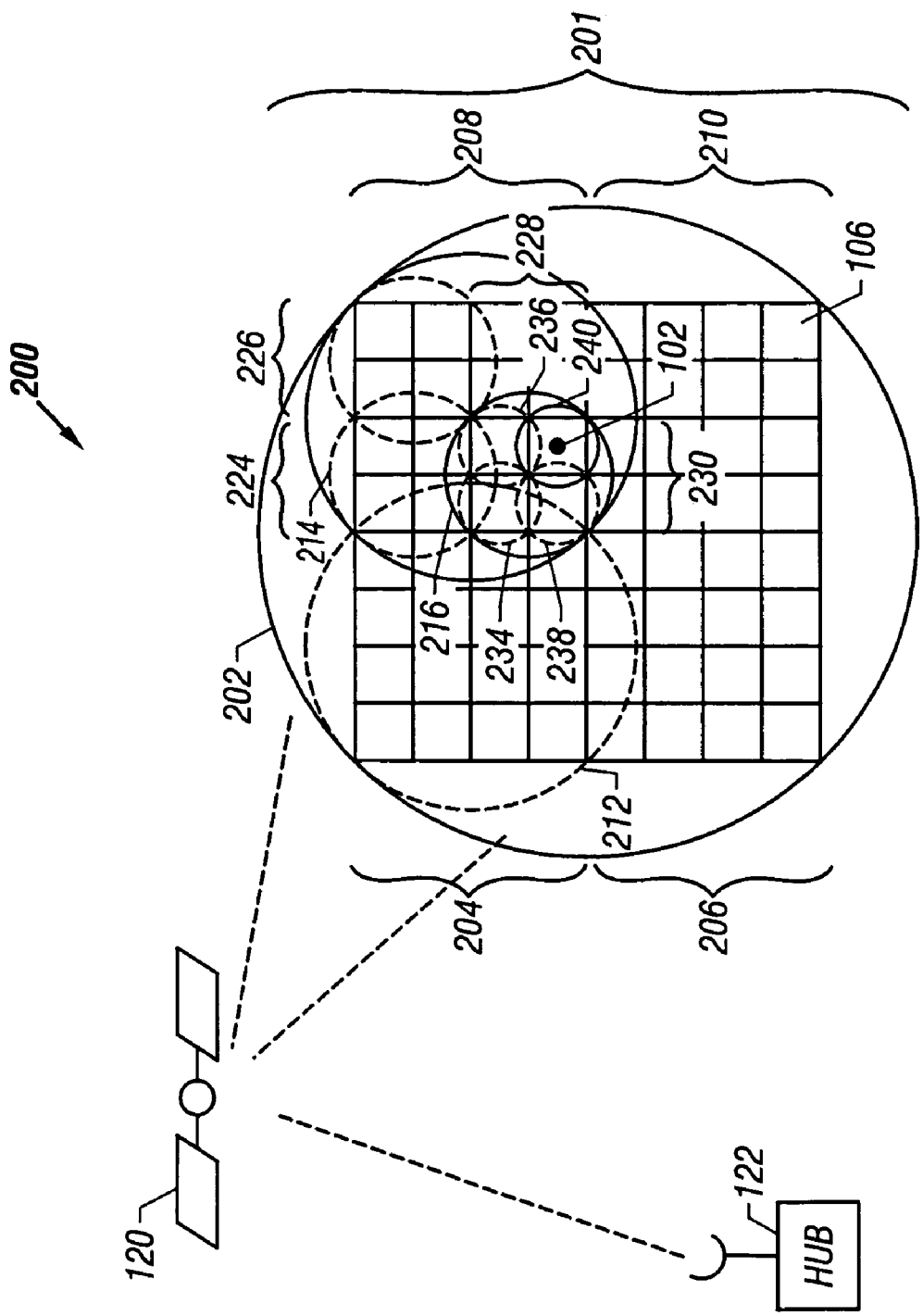
FIG. 2 is a diagram illustrating a method for locating a specific subscriber in a coverage area by zooming and scanning according to an embodiment of the present invention.

FIG. 2 is a diagram illustrating another method 200 for locating a specific subscriber in a coverage area by performing both zooming and scanning of a beam. The beam may be formed by a beamformer on the transponder platform or by a ground-based beamformer using the CDMA communications system in the example of FIG. 1. The coverage area 104 is defined by the arrangement of a plurality of cells 106. In this example, each of the cells 106 has the same area. An initial 8×8 cell cluster 201 is defined that, in this example, includes the entire coverage area. A beam 202 is zoomed to form a beam that corresponds to the area of the initial cell cluster 201. A locating signal is received from the specific subscriber 102 that confirms that the specific subscriber 102 is in one of the cells 106 included in the initial cell cluster 201. The initial cell cluster 201 is then partitioned into four new 4×4 cell clusters 204, 206, 208, and 210. The beam 202 is zoomed to become the smaller beam 212 that corresponds to the area of one of the new 4×4 cell clusters 204, 206, 208, and 210 and is scanned or stepped in raster fashion to each new cell cluster successively until a locating signal is received from the specific subscriber 102. The cell cluster containing the specific subscriber 102, i.e., cell cluster 208, is then partitioned into four new 2×2 cell clusters 224, 226, 228, and 230. The beam 212 is zoomed to become the smaller beam 214 that corresponds to the area of one of the new 2×2 cell clusters 224, 226, 228, and 230 and is scanned in raster fashion to each new cell cluster successively until a locating signal is received from the specific subscriber 102 in cell cluster 230. The cell cluster 230 containing subscriber 102 is then partitioned into four new 1×1 cell clusters 234, 236, 238, and 240. The beam 214 is zoomed to become the smaller beam 216 that corresponds to the area of one of the new 1×1 cell clusters 234, 236, 238, and 240 and is scanned in raster fashion to each new cell cluster until a locating signal is received from subscriber 102 in cell cluster 240. Because the new 1×1 cell clusters 234, 236, 238, and 240 now contain only one cell each, the specific subscriber 102 has now been located or acquired.

Only 10 beam steps were required in this example compared to 30 steps in the example of FIG. 1, thus reducing the total dwell time by 67 percent. On average, a dwell time of only 8.5T (based on a minimum of four and a maximum of 13 beam steps) is required for the approach used in this example compared to 32T in the approach of FIG. 1, nearly four times faster.

Another advantage of the method 200 of FIG. 2 is that it may be implemented with existing ground-based digital beamformers simply by adding software using standard beamforming functions and a beam zooming method, such as the one described below. As an example, the ground-based beamformer in a CDMA communications system gateway hub 122 in FIG. 1 can perform the zooming and scanning of the beam 214.

Figure 3A:
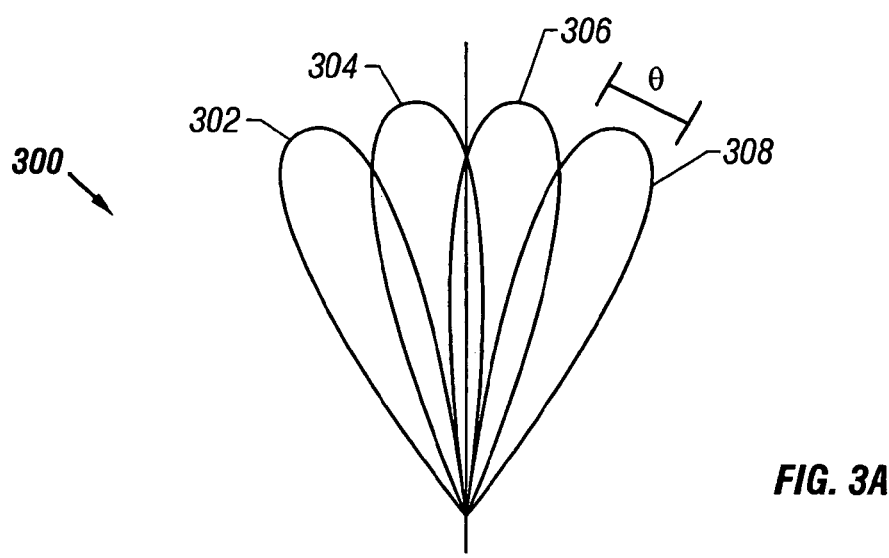
FIGS. 3A–3C are beam plots illustrating an exemplary method for zooming a beam that may be used with the method illustrated in FIG. 2.
Figure 3B:
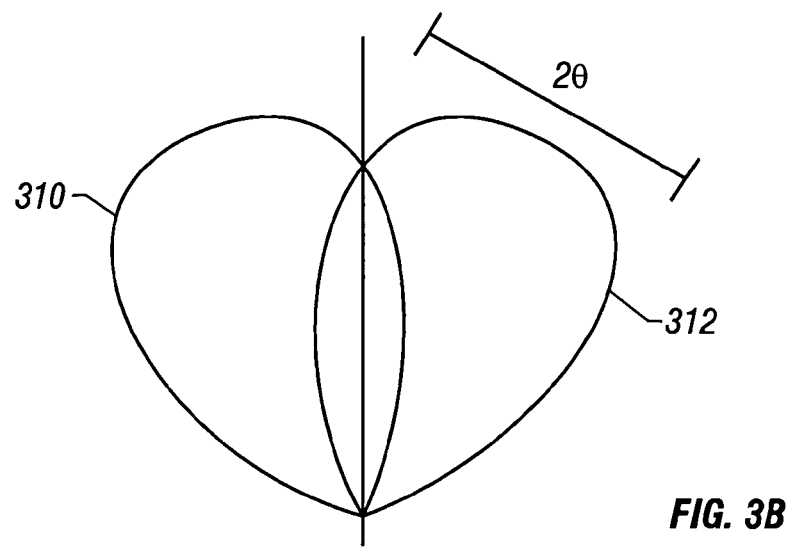
Figure 3C:
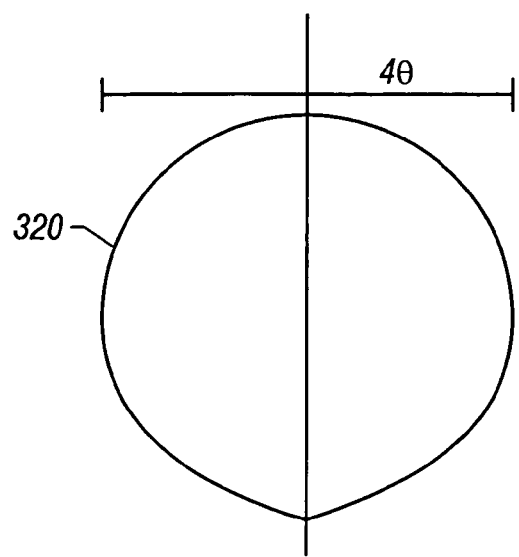

FIGS. 3A–3C are beam plots illustrating a method 300 for zooming a beam that may be used with the embodiment illustrated in FIG. 2. In FIG. 3A, individual beams 302, 304, 306, and 308 each have a width angle θ that corresponds to the area of one of the plurality of cells 106 in FIG. 2. In FIG. 3B, the beams 302 and 304 are added to form a zoomed beam 310, and the beams 306 and 308 are added to form a zoomed beam 312. Each of the zoomed beams 310 and 312 has twice the width angle of the individual beam 302, thus corresponding to a cell cluster size of 2×2, or four cells.

In FIG. 3C, the zoomed beams 310 and 312 are added to form a zoomed beam 320 that has four times the width angle of the individual beam 302, thus corresponding to a cell cluster size 4×4, or 16 cells. Other beam combinations may be used according to this method to zoom beams to correspond to the areas of various cell cluster sizes.

Figure 4:
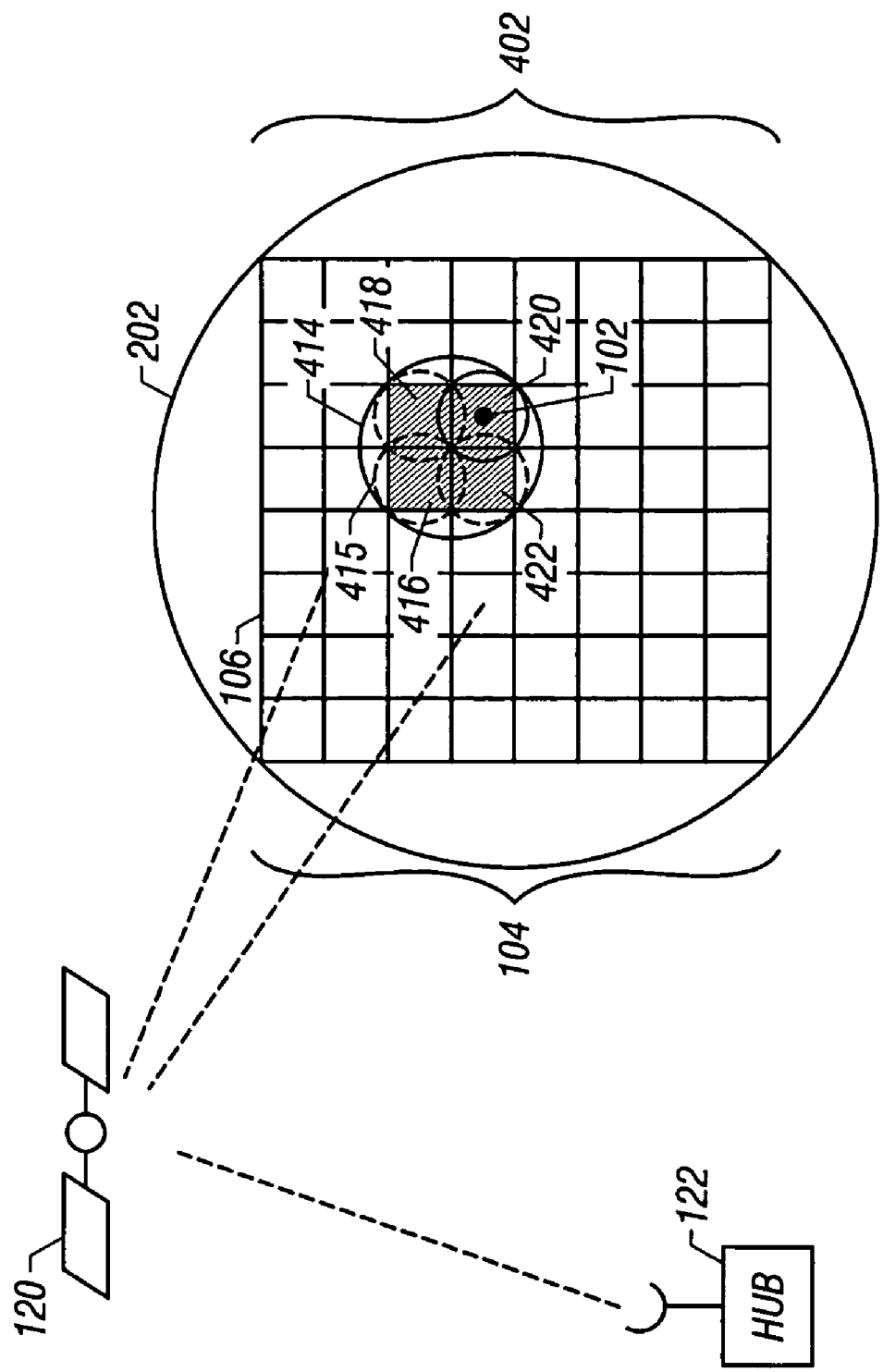
FIG. 4 is a diagram illustrating the method illustrated in FIG. 2 further enhanced by including a traffic model.

FIG. 4 is a diagram illustrating the method illustrated in FIG. 2 further enhanced by a traffic model. A further advantage of beam zooming is realized by adapting to a real-time communications traffic pattern that may have a diurnal cycle and differ from zone to zone within the coverage area. Traffic models may be updated, stored, and accessed in the traffic model by a ground-based beamformer to further reduce the acquisition time. The "spokes and hub" architecture is well suited to the use of traffic models because cell size and search strategy based on traffic conditions and models may be updated at the gateway hub without passing information back and forth between the gateway hub and the transponder platform, thus conserving valuable communications resources.

Special events may have a great influence on the traffic model. For example, an initial 2×2 cell cluster 402 that is smaller than the coverage area 104 may be defined for a known high traffic area stored in the traffic model that contains only four 1×1 cell clusters 416, 418, 420, and 422. The beam 202 is zoomed directly to the beam 414 that corresponds to the area of the cell cluster 402, and a locating signal is received from the specific subscriber 102 that confirms that the specific subscriber 102 is in one of the cells 106 included in the initial cell cluster 402. The initial cell cluster 402 is partitioned into four new 1×1 cell clusters 416, 418, 420, and 422, and the beam 414 is zoomed to the beam 415 that corresponds to the area of one of the four new 1×1 cell clusters 416, 418, 420, and 422. The beam 415 is scanned sequentially until the specific subscriber 102 is acquired in the cell cluster 420.

Based on the traffic model, there is a high probability that the position of the specific subscriber 102 is in the high traffic area defined by the cell cluster 402, which is much smaller than the entire coverage area 104. The reduced initial cluster size advantageously reduces the size of the initial cell cluster and consequently the total dwell time even further than the method illustrated in FIG. 2. Alternatively, a sequential search using mixed cell cluster sizes may be used if only one acquisition code address for subscriber 102 (e.g., CDMA systems) is used. If two acquisition code addresses are used for subscriber 102, the high traffic area may be allocated a dedicated acquisition code and two searches may be conducted in parallel using two beams. One beam would be used to perform the search described with reference to FIG. 2, and the other beam would be used to perform the search described with reference to FIG. 4. If the position of subscriber 102 is successfully predicted by the traffic model, the latter search would be terminated before the former, thus reducing the acquisition time by the fastest method.

The traffic model allows the acquisition of the specific subscriber 102 to be adapted to real-time traffic conditions stored in user position files residing in the gateway station or hub 122. In communications systems having a beamformer in the transponder platform, the traffic model information would have to be transmitted back and forth between the gateway and the transponder platform, which would actually increase the time delay for acquiring the specific subscriber 102. In a ground based beamforming system, however, the traffic model may advantageously be implemented in the ground station without the delay of relaying the traffic model information to the transponder platform.

Figure 5:
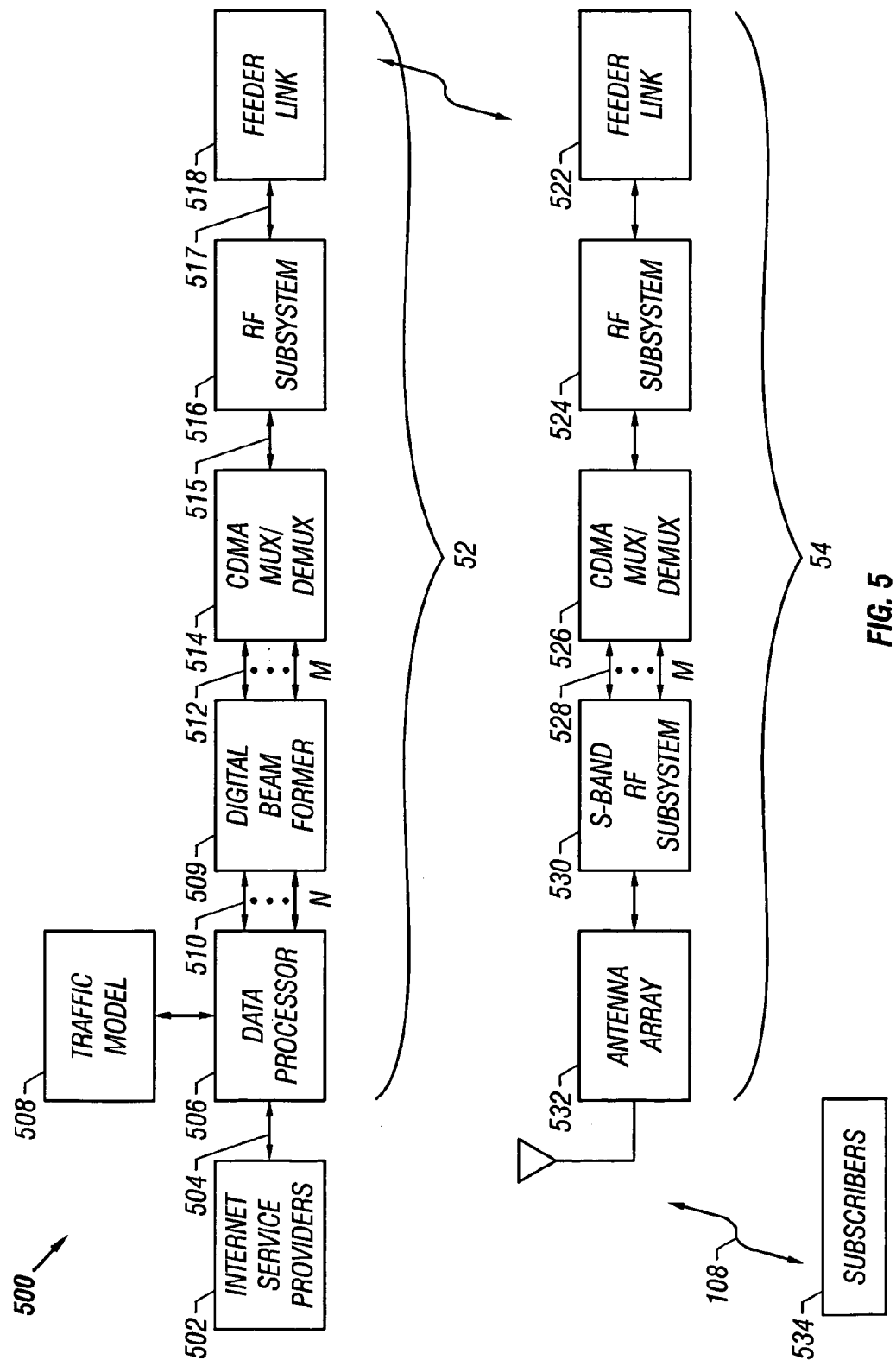
FIG. 5 is a block diagram of an exemplary ground-based beamformer that may be used to implement the methods illustrated in FIGS. 2 and 4.

FIG. 5 is a block diagram of an exemplary ground-based beamformer 500 that may be used to implement the methods illustrated in FIGS. 2 and 4. The ground-based beamformer 500 includes a ground station 52 and a stratospheric transponder platform 54.

Shown in the ground station 52 are a data processor 506 that interfaces in this example with communications traffic 504 to and from internet service providers 502, a traffic model module 508, a digital beamformer 509, beam signals (1-N) 510, element signals (1-M) 512, a CDMA multiplexer/demultiplexer 514, CDMA signals 515, A C- or X-band RF subsystem 516, and a feeder link 518.

The data processor 506 performs multiplexing, demultiplexing, routing, and formatting of beam signals 510 according to well-known techniques. The data processor 506 is coupled to the digital beamformer 509 and includes the functions of beam zooming and scanning beams in raster sequence as described above and illustrated in FIG. 2.

The traffic model module 508 coupled to the data processor 506 may be included for storing and updating traffic models as described above to further improve subscriber acquisition time as illustrated in FIG. 4. The traffic model module 508 includes the user position files and real-time traffic conditions as described for FIG. 4.

The beam signals 510 are received as input to the digital beamformer 509 when transmitting to the subscribers 534 or generated as output from the digital beamformer 509 to the data processor 506 when receiving signals from the subscribers 534. The digital beamformer 509 receives as inputs or generates as outputs element signals 512 corresponding to the beam signals 510. The digital beamformer 509 may be implemented using well-known techniques. A code division multiple access (CDMA) mux/demux 514 multiplexes/demultiplexes the element signals 512 as described above to/from a C- or X-band RF subsystem 516 according to well-known techniques. The C- or X-band RF subsystem 516 inputs/outputs CDMA signals 515 and transmits/receives C- or X-band signals 517 to/from a feeder link 518 that links the element signals 512 between the ground station 52 and the stratospheric transponder platform 54.

The stratospheric transponder platform 54 includes a feeder link 522, a C- or X-band RF subsystem 524, and a CDMA mux/demux 526 that may be implemented according to well known techniques as described above. An S-band RF subsystem 530 amplifies element signals (1-M) 528 for transmitting/receiving by an antenna array 532 to/from the subscribers 534 on the beams 108. The operation of antenna array 532 is assumed to be reversible between transmit and receive modes, thus the beamforming method of this example applies both to transmitting and receiving signals. The stratospheric transponder platform 54 may be, for example, a communications satellite, an unmanned aircraft, or an antenna tower.

For the user acquisition function, the stratospheric transponder platform 54 and the gateway hub 52 only receive the locating signal and do not transmit any signals to the subscriber 534 being acquired. Thus, in FIG. 5, the locating signal originates from the subscriber 534 being acquired and is relayed by the stratospheric transponder platform 54 to the gateway hub 52. When receiving the locating signal from the subscriber 534 being acquired, the inputs to the digital beamformer are the element signals 512 and the outputs are the beams 510. One or two of the beams may be used for user acquisition. The zooming and scanning functions may be performed mathematically in the digital beamformer in two steps: (1) multiplying the M element signals by an appropriate set of M weights represented as complex numbers, and (2) summing the M weighted signals to determine the output beam signal. The sets of complex weights may be computed using well known techniques.

Figure 6:
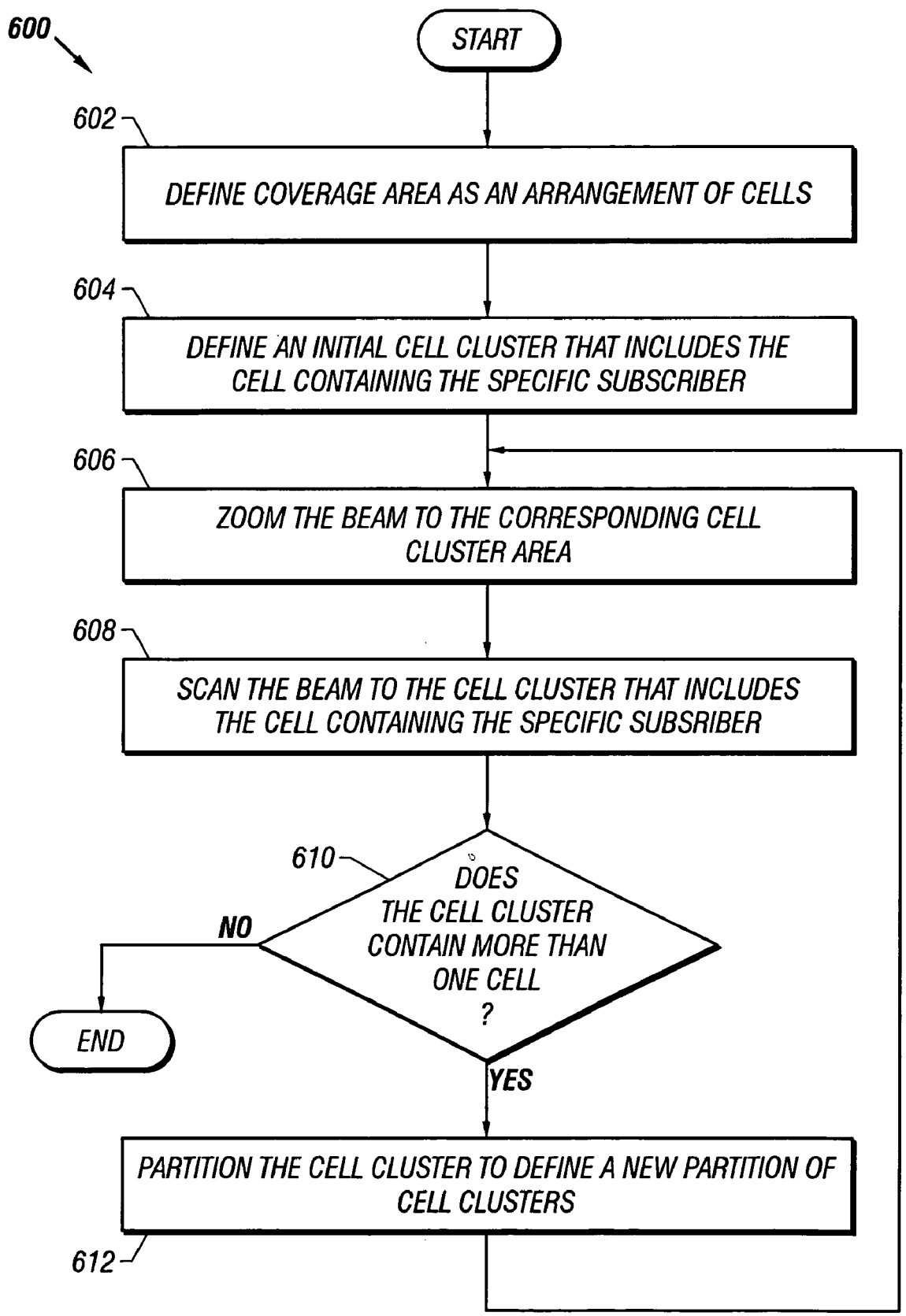
FIG. 6 is a flow chart of the method of FIG. 2 for rapid user acquisition for stratospheric transponder platforms by a ground-based beamformer.

FIG. 6 is a flow chart 600 of the method illustrated in FIG. 2 for rapid user acquisition for stratospheric transponder platforms by beams formed by the ground-based beamformer of FIG. 5. Step 602 defines a coverage area as an arrangement of cells such as that shown in FIG. 2. Step 604 defines an initial cell cluster that includes the cell containing the specific subscriber. The initial cluster may be selected as the entire coverage area or a portion of the coverage area determined by a traffic model as explained above. Step 606 zooms the beam to form a beam that corresponds to an area of one of the cell clusters. Step 608 scans the beam to the cell cluster that includes the specific subscriber. Step 610 partitions the cell cluster that includes the specific subscriber to define a new partition of cell clusters. Step 612 repeats steps 606, 608, and 610 until the partition contains only one cell, i.e., the cell containing the specific subscriber.

Other modifications, variations, and arrangements of the present invention may be made in accordance with the above teachings other than as specifically described to practice the invention within the spirit and scope defined by the following claims.

The invention claimed is:

1. A method for rapid acquisition of a specific subscriber comprising the following steps:
    (a) defining a coverage area as an arrangement of a plurality of cells wherein one of the plurality of cells includes a specific subscriber;
    (b) defining a partition of cell clusters wherein one of the cell clusters includes the one of the plurality of cells that includes the specific subscriber;
    (c) forming a beam that corresponds to an area of one of the cell clusters; and
    (d) sequentially scanning the beam to each of the cell clusters until the one of the cell clusters that includes the specific subscriber is identified.

2. The method of claim 1 wherein step (b) includes defining the partition from a traffic model to enhance acquisition of the specific subscriber.

3. The method of claim 1 further comprising after step (d) the step of (e) partitioning the cell cluster that includes the specific subscriber into a plurality of cell clusters.

4. The method of claim 3 wherein each of the plurality of cell clusters has an equal number of cells.

5. The method of claim 3 further comprising after step (e) the step of (f) zooming the beam to form a beam that corresponds to an area of one of the plurality of cell clusters.

6. The method of claim 5 wherein step (f) comprises combining beams corresponding to an area of at least one of the plurality of cells to form the beam.

7. The method of claim 5 further comprising the step of repeating steps (d), (e), and (f).

8. An apparatus for rapid acquisition of a specific subscriber comprising:
 a stratospheric transponder platform having an antenna for one of transmitting and receiving a beam; and
 a ground station coupled to the stratospheric transponder platform wherein the ground station comprises a beamformer for zooming a beam corresponding to an area of a cell cluster within a partition containing a plurality of cell clusters and sequentially scanning the beam to aim at each of the cell clusters until one of the plurality of cell clusters that includes the specific subscriber is identified.

9. The apparatus of claim 8 wherein the ground station further comprises a traffic model module for defining the partition.

10. The apparatus of claim 8 wherein each of the plurality of cell clusters has an equal number of cells.

11. The apparatus of claim 8 wherein the beamformer zooms the beam by combining beams corresponding to an area of at least one of the plurality of cells.

12. A method for rapid acquisition of a specific subscriber comprising the following steps:
 (a) defining a coverage area as an arrangement of a plurality of cells wherein one of the plurality of cells is a specific subscriber cell including the specific subscriber;
 (b) partitioning the plurality of cells into cell clusters each formed from more than one of the plurality of cells wherein one of the cell clusters includes the specific subscriber cell;
 (c) forming a beam that corresponds to an area of one of the cell clusters;
 (d) sequentially scanning the beam to each of the cell clusters until the one of the cell clusters that includes the specific subscriber is identified;
 (e) partitioning the one of the cell clusters that includes the specific subscriber into a second plurality of cell clusters;
 (f) zooming the beam to form a beam that corresponds to an area of one of the second plurality of cell clusters; and
 (g) sequentially scanning the beam to each of the second plurality of cell clusters until one of the second plurality of cell clusters that includes the specific subscriber is identified; and
 (h) determining a location of the specific subscriber cell in response to scanning the beam to one of the second plurality of cell clusters that includes the specific subscriber.

13. The method of claim 12 wherein partitioning the plurality of cells comprises partitioning the plurality of cells in response to a traffic model.

14. The method of claim 12 wherein partitioning the plurality of cells into cell clusters comprises partitioning the plurality of cells into clusters each having an equal number of cells.

15. A method for rapid acquisition of a specific subscriber comprising:
 defining a coverage area having a plurality of cells wherein one of the plurality of cells includes the specific subscriber generating a locating signal;
 defining at least a first cell cluster and second cell cluster within the plurality of cells;
 zooming a beam to a first size;
 sequentially scanning the first cell cluster and the second cell cluster;
 identifying the first cell cluster when the locating signal is received therefrom;
 partitioning the first cell cluster into a third cell cluster and a fourth cell cluster;
 zooming the beam to a second size;
 thereafter, confirming the specific subscriber is within the third cell cluster in response to the locating signal; and
 partitioning and zooming until a location of the specific subscriber is determined.

16. The method of claim 15 wherein zooming a beam to a first size comprises zooming a beam to a first size corresponding to an area of the first cell cluster or the second cell cluster.

17. The method of claim 15 wherein zooming the beam to a second size comprises zooming a beam to a second size corresponding to an area of the third cell cluster or the fourth cell cluster.

18. The method of claim 15 wherein partitioning the plurality of cells comprises partitioning the plurality of cells into an equal number.

19. A method for rapid acquisition of a specific subscriber comprising:
 defining a coverage area having a plurality of cells wherein one of the plurality of cells includes a specific subscriber cell having a specific subscriber therein; and
 partitioning the cells into progressively smaller clusters; and
 zooming and sequentially scanning a beam to the progressively smaller clusters until a location of said specific subscriber cell is determined.

20. A method for rapid acquisition of a specific subscriber comprising:
 defining a coverage area having a plurality of cells wherein one of the plurality of cells includes a specific subscriber generating a locating signal;
 defining a first cell cluster from the plurality of cells according to a traffic model;
 zooming and sequentially scanning a beam to a first size corresponding to the first cell cluster;
 confirming that the specific subscriber is within the first cell cluster;
 partitioning the first cell cluster into a second cell cluster and a third cell cluster;
 zooming and sequentially scanning the beam to a second size;
 thereafter, confirming that the specific subscriber is within the third cell cluster; and
 partitioning and zooming until a location of the specific subscriber cell is determined.

21. The method of claim 20 wherein confirming that the specific subscriber is within the first cell cluster comprises receiving the locating signal from the user.

22. The method of claim 20 wherein zooming the beam to a second size comprises zooming the beam to a second size corresponding to the third cell cluster.

23. A method for rapid acquisition of a specific subscriber comprising:
 defining a coverage area having a plurality of cells wherein one of the plurality of cells includes a specific subscriber having a first acquisition code address and a second acquisition code address associated therewith;

performing a first acquisition method and a second acquisition method in parallel until a location of a specific subscriber cell is determined, wherein
    performing a first acquisition method comprises
        using a first acquisition code address, partitioning the cells into first progressively smaller clusters; and
        zooming and scanning a first beam to the first progressively smaller clusters; and performing a second acquisition method comprises
    using a second acquisition code address, partitioning the cells into second progressively smaller clusters according to a traffic model; and
    zooming and scanning a second beam to the second progressively smaller clusters.

* * * * *